INVENTORS
Merle H. Griswold
George L. Soltis
John G. Wallace
BY
Curtis Morris & Safford
ATTORNEYS March 8, 1966 M. H. GRISWOLD ETAL 3,239,230

DICTATION APPARATUS

Filed May 15, 1963 6 Sheets-Sheet 2

DICTATION APPARATUS

Filed May 15, 1963 6 Sheets-Sheet 6

3,239,230
DICTATION APPARATUS

Merle H. Griswold, Trumbull, George L. Soltis, Shelton, and John G. Wallace, Branford, Conn., assignors to Dictaphone Corporation, Bridgeport, Conn.

Filed May 15, 1963, Ser. No. 280,650
18 Claims. (Cl. 274—21)

This invention relates to dictation apparatus of the type including a transducing head mounted for relative traveling movement with respect to a sound record. More in particular, this invention relates to remotely-controlled power-operated means for automatically back-spacing and forward-spacing the transducing head in incremental steps with respect to the record. The specific apparatus disclosed herein is intended for use in transcribing machines, i.e. those machines which normally are operated by a secretary to play back previously recorded dictation for the purpose of placing this dictation in typed form. However, it will be evident that the utility of the invention is not limited to machines of this specific type.

When a secretary transcribes dictation, she often finds it necessary to play back certain portions of the dictated material two or more times, for example, for the purpose of determining the precise wording or to check a particular section for accuracy in view of subsequently dictated material. To replay a portion of the record, it first is necessary to backspace the transcribing machine to return the playback head to the particular desired segment of dictated material. This backspacing movement can be accomplished manually, although preferably it is produced by a power-operated mechanism which shifts the playback head back in incremental steps, e.g. as disclosed in copending application Serial No. 196,189, filed on May 21, 1962 by W. F. Wolfner et al.

It will be evident that the distance the carriage must be backspaced depends upon the location of the dictated material to be replayed with respect to the present position of the reproducing head. Partly as a consequence of this factor, it has been found advantageous for the secretary to have means for controlling the size of the incremental step produced by the back-spacing mechanism, and such means forms one of the features of the present invention. Another feature of the present invention is the provision of power-operated means to forward-space the carriage in incremental steps, e.g. to permit the transcribing secretary quickly to return the playback head to the position it occupied prior to the backspacing movement. This forward movement is accomplished by a mechanism which uses in common many of the elements of the backspacing mechanism, thus providing a significant saving in parts and complexity.

Accordingly, it is an object of this invention to provide dictation apparatus which is superior to that available heretofore. A further object of this invention is to provide improved means for controllably backspacing and forward-spacing the carriage of dictation apparatus. Other objects, aspects and advantages of the present invention will in part be apparent from, and in part pointed out in, the following description considered together with the accompanying drawings, in which.

Figure 1:
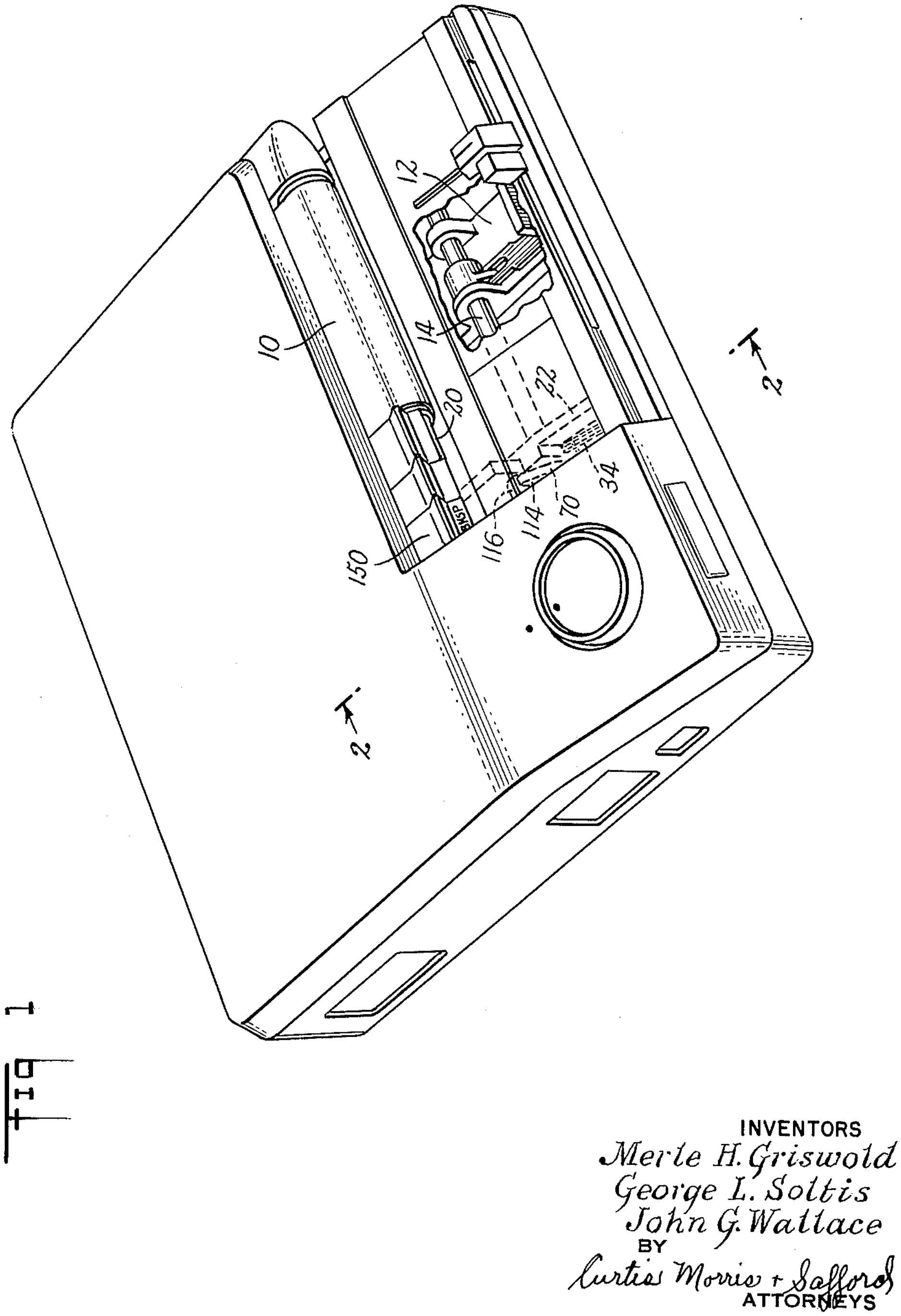
FIGURE 1 is a perspective view, partly cut-away, of a transcribing machine embodying the present invention.

Referring now to FIGURE 1, there is shown a transcribing machine having a general configuration very similar to that of the dictating machine disclosed in the above-mentioned copending application Serial No. 196,-189. This transcribing machine includes a pair of rotatable mandrels about which a plastic belt record 10 is tautly positioned for rotation above a reproducing head (not shown) engageable with the record. This reproducing head is supported by a carriage 12 which is slidably mounted on a guide rod 14 for traversing movement parallel to the axes of the mandrels so that the reproducing head can follow the helical sound grooves of dictation previously swaged in the record. During a playback operation, the carriage is driven forward in a conventional manner by the usual feedscrew engaged by a feed nut on the carriage.

Backspacing movement of the carriage 12 is obtained in a manner broadly similar to that disclosed in the above-identified copending application. More in particular, during a backspacing operation the following sequence of steps is carried out: (1) the carriage is locked to the guide rod 14, (2) the guide rod is moved an incremental distance axially to the left, thereby shifting the carriage back a corresponding distance, (3) the carriage is released from the guide rod, and (4) the guide rod is spring-returned to its original position leaving the carriage in its new position.

The apparatus embodying the present invention provides a number of improvements over the arrangement disclosed in the above-mentioned copending application. For example, this apparatus incorporates means for adjusting the size of the backspacing step so that, when the carriage is to be moved back a considerable distance, a large backspacing step can be used to obtain rapid reverse movement of the carriage, and when precise setting of the carriage is required, a small backspacing step can be used. In addition, the present invention provides means for forward-spacing the carriage in incremental steps, and this movement is obtained by a mechanism which includes many of the same elements required for the backspacing movement. This forward-spacing movement of the carriage is effected at an average speed much faster than the advancing movement produced by the feedscrew, and thus the transcribing secretary can move the carriage forward rapidly to a desired position without having to shift the carriage by hand.

Figure 2:
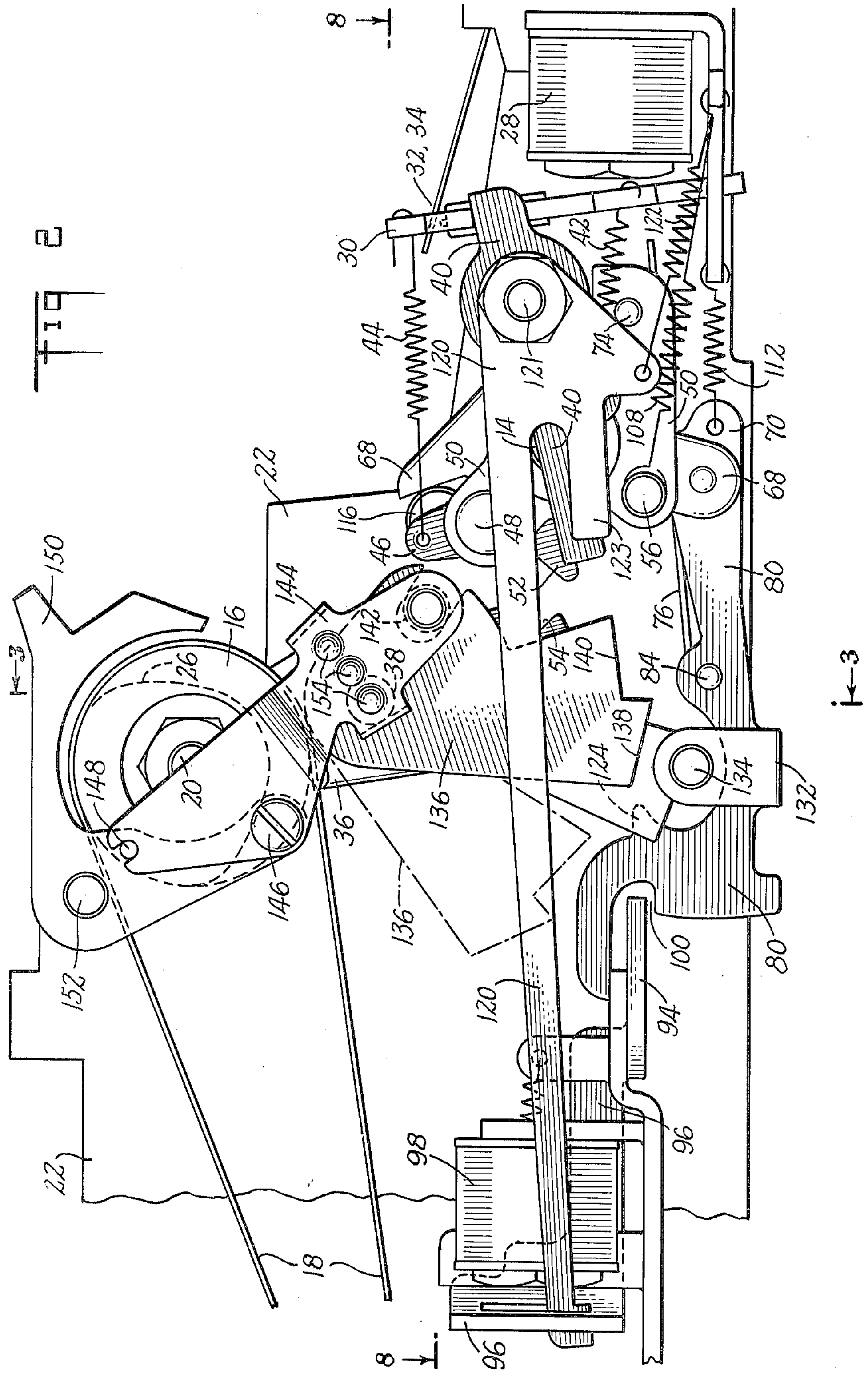
FIGURE 2 is a cross section taken along line 2—2 of FIGURE 1 to show the general arrangement of the back-spacing and forward-spacing mechanism.

Referring now to FIGURE 2, motive power is supplied to all of the operational parts of the machine by means of a pulley 16 which is rotated by a belt 18 driven through an electrically-actuated clutch (not shown). In a transcribing machine, this clutch preferably is controlled by a foot pedal, so that the transcribing secretary's hands will be free to operate the typewriter.

Figures 3, 7:
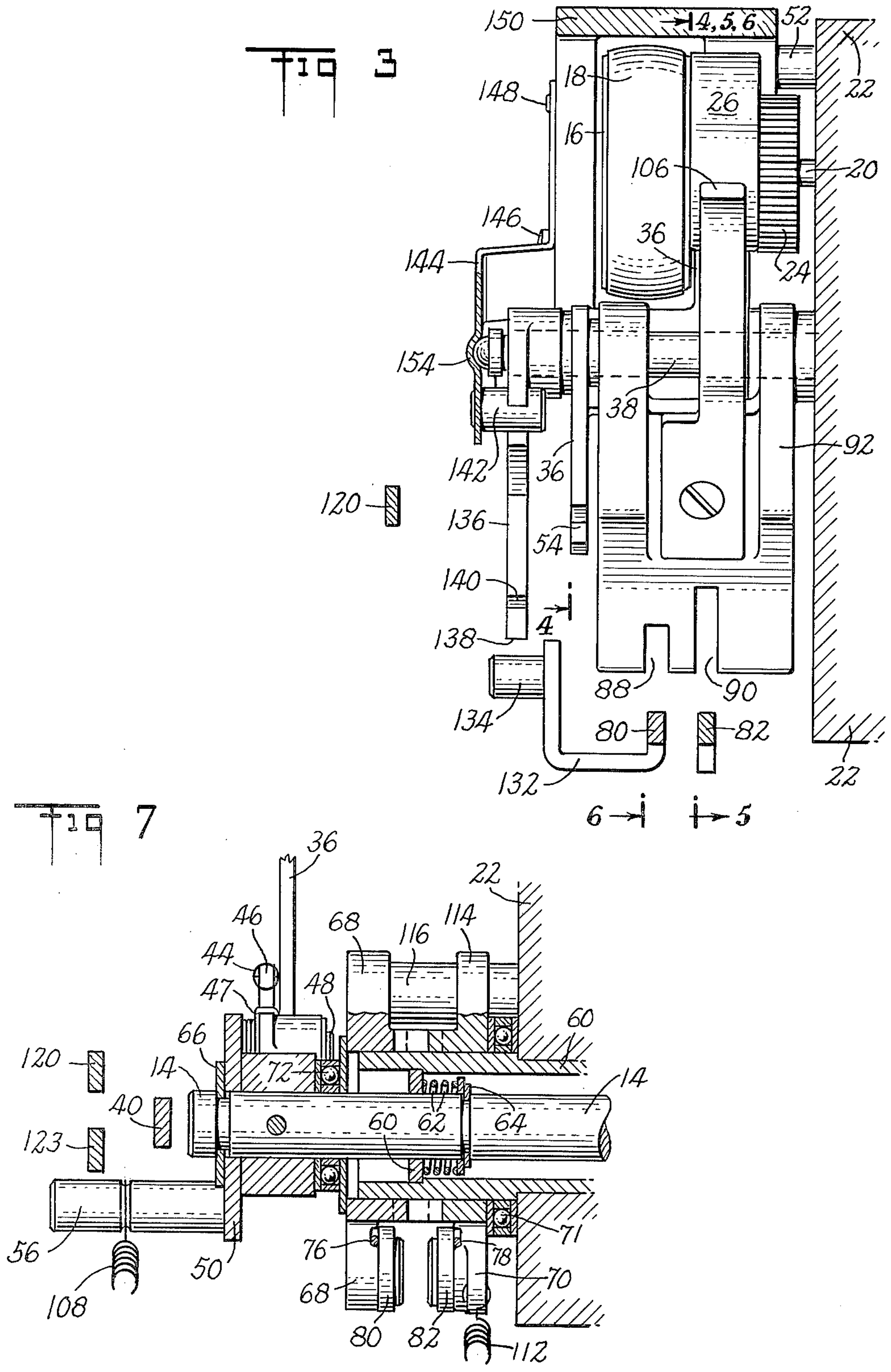
FIGURE 3 is a detail section, taken along line 3—3 of FIGURE 2.
FIGURE 7 is a vertical section taken along line 7—7 of FIGURE 6 to show interior details of the carriage guide rod support.

Referring also to FIGURE 3, the pulley 16 is mounted on a shaft 20 which extends through the machine frame 22 to rotate the drive mandrel for the record 10. This shaft also carries a spur gear 24 which, through conventional drive train means (not shown herein), rotates the usual machine feedscrew to traverse the carriage 12 past the sound record. Also mounted on shaft 20 is a plastic cam 26 which provides the actuating power for the back-spacing and forward-spacing mechanism to be described.

As mentioned hereinabove, the first step in producing either a backspacing or forward-spacing movement of the carriage 12 is to lock this carriage to the guide rod 14. The means used in the present embodiment for locking this carriage to the guide rod is identical to that disclosed in the above-identified copending application Serial No. 196,189, and thus need not be described herein in detail. However, it should be noted that this type of locking means is actuated by rotating the guide rod about its longitudinal axis, thus developing a frictional bind between the guide rod and the bushing which slidably supports the carriage on the guide rod. In addition, as disclosed in that copending application, this rotation of the guide rod is effective, through special linkages on the carriage, to disengage the feed nut from the feedscrew and also to retract the reproducing head from the record 10. Thus, the carriage is free to be shifted laterally with respect to the record when the guide rod subsequently is moved axially as described hereinafter.

Figure 4:
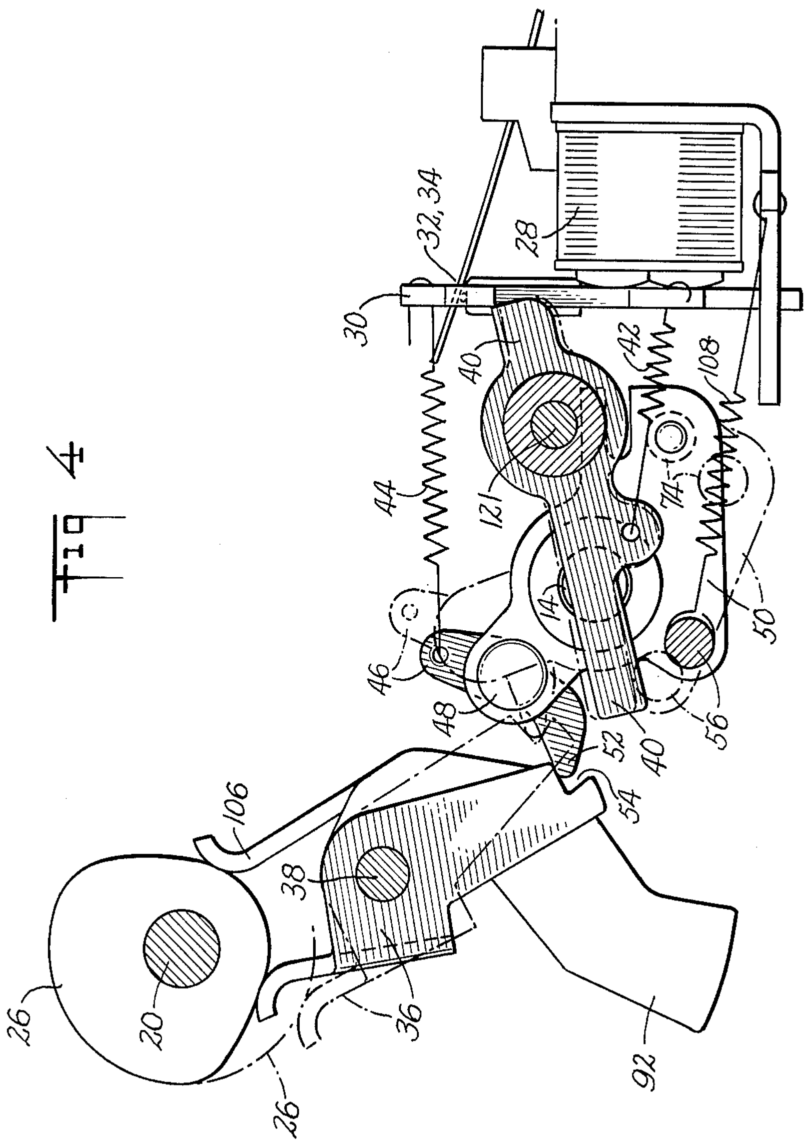
FIGURES 4, 5 and 6 are detail cross sections taken along corresponding lines in FIGURE 3 to show aspects of the cam-driven operating mechanism.
Figure 8:
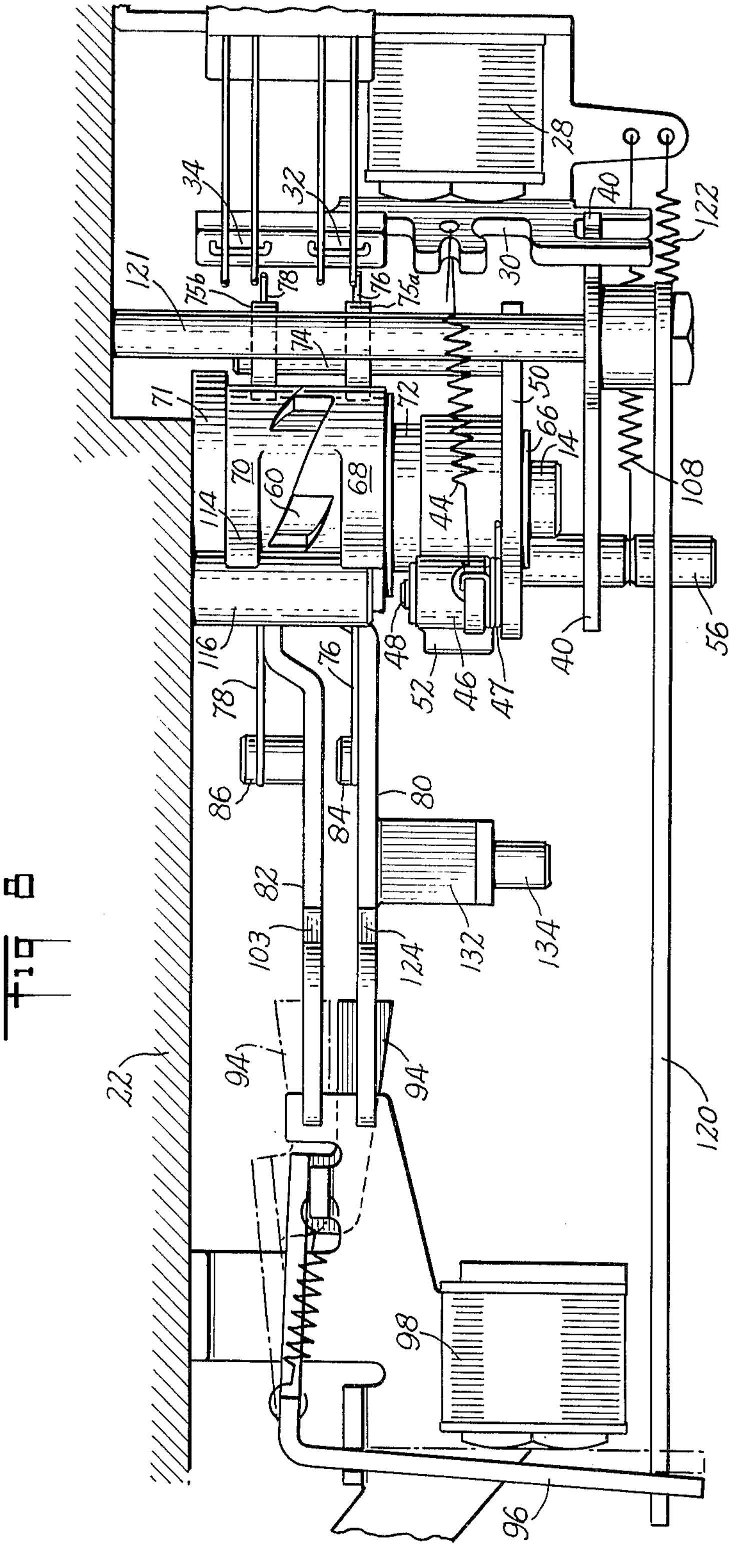
FIGURE 8 is a horizontal section taken along line 8—8 of FIGURE 2.

Referring now to the right-hand portion of FIGURE 2, the operating mechanism for both forward-spacing and backspacing is activated initially by an actuator solenoid 28 which preferably is energized through a foot-switch operated by the transcribing secretary. Referring also to FIGURES 4 and 8, when the armature 30 of this solenoid is pulled into its actuated position (as shown in FIGURE 4), two sets of switch contacts 32 and 34 are closed in order to energize the machine clutch and to "mute" the sound circuit leading to the secretary's earpiece.

By thus energizing the machine clutch, the cam 26 is caused to be rotated at constant speed by the pulley-driven shaft 20. This cam rotation, in turn, produces an oscillatory motion of a cam follower 36 pivoted about a shaft 38. Actuation of the armature 30 also permits a latch 40 to be rotated by its spring 42 up into locking position (solid outline in FIGURE 4) where it holds the armature 30 in actuated position. This insures completion of at least one incremental step of carriage movement, even though the solenoid 28 be energized only momentarily.

The solenoid armature 30 is connected through a coil spring 44 to a generally crescent-shaped plastic pawl 46 which is rotatably mounted at 48 on one lobe of a bell crank 50 rigidly attached to the guide rod 14. This pawl normally is biased counterclockwise by a small spring 47. However, when the solenoid armature 30 is pulled into its actuated position, the force transmitted by the spring 44 rotates the pawl 46 clockwise so that its toe 52 is positioned opposite a notch 54 in the lower end of the cam follower 36. Thus, as this cam follower swings counterclockwise about shaft 38 due to the rotation of cam 26, the notch 54 engages toe 52 to rotate bell crank 50 and guide rod 14.

As explained hereinabove, this rotational movement of the guide rod 14 causes the carriage 12 to be locked to the guide rod and also disengages certain elements on the carriage so that it may be backspaced or forward-spaced without interference when the guide rod subsequently is shifted axially in the selected direction. As the guide rod approaches its maximum rotational position, a latch release pin 56 (FIGURE 4), projecting out laterally from bell crank 50, strikes latch 40 to rotate it out of locking engagement with armature 30. Thus, this armature is free to return to its normal position, providing the solenoid 28 has in the meantime been de-energized by release of the foot control switch.

As shown in FIGURE 7, the guide rod 14 is supported for axial movement in a bearing sleeve 60 secured to the machine frame 22. A coil spring 62 surrounds the guide rod and is compressed between a transverse wall of sleeve 60 and a retaining ring or collar 64 secured to the rod, thereby urging this rod towards the right. However, movement of the guide rod in this direction is limited by an assembly including a second retaining ring 66 which is secured to the guide rod and bears at its periphery against the bell crank 50 which in turn bears against a face cam 68 engaged with a matching face cam 70. These two cams 68 and 70 are rotatably and slidably mounted on the outer surface of sleeve 60, cam 70 being prevented from moving to the right by a bearing 71 abutting the machine frame 22. A second bearing 72 is located between bell crank 50 and face cam 68.

Referring now to FIGURES 4 and 8, the bell crank 50 carries a horizontal control rod 74 on which is rotatably mounted a pair of collars 75*a* and 75*b*. These collars are formed with ears which are apertured to receive the free ends of a pair of parallel wire springs 76 and 78 extending at right angles to the axis of rod 74 (see also FIGURES 5 and 6). The central portions of these wire springs extend through slots defined by projections on the lower extensions of cams 68 and 70 (see FIGURE 7) where the latter are pivotally pinned respectively to a pair of links 80 and 82, and the remote ends of the wire springs are pivotally pinned at mid-points 84 and 86 of these links. Thus, when control rod 74 is moved downwardly by the bell crank 50, the wire springs 76 and 78 are rotated about an axis at the front ends of links 80 and 82, thereby tending to lift the rearward ends of these links up into corresponding slots 88 and 90 (FIGURE 3) in an actuator arm 92.

Referring now to FIGURES 2 and 8, adjacent the rearmost ends of the links 80 and 82 is a selector tongue 94 which is shiftable between these links by the armature 96 of a selector solenoid 98. Energization of this solenoid together with actuator solenoid 28 produces a backspacing movement of the carriage 12, whereas energization of the actuator solenoid 28 alone produces a forward-spacing movement of the carriage.

Thus, solenoid 98 serves to determine whether the operating mechanism produces a backspacing or a forward-spacing movement, this control effect being exercised by the shiftable tongue 94. When this tongue is in the position shown in solid outline in FIGURE 8, it extends into a slot 100 (see also FIGURE 6) in link 80, and thereby prevents this link from being lifted up by its wire spring 76 when the control rod 74 presses down the free ends of both springs 76 and 78. Thus, when solenoid 98 is deenergized, only link 82 is lifted up. Alternately, if tongue 94 is shifted into the dotted line position shown in FIGURE 8, it extends into a slot 102 (FIGURE 5) in the other link 82 to prevent this other link from being lifted up. Accordingly, when solenoid 98 is energized, only link 80 is lifted up.

Figures 5, 6:
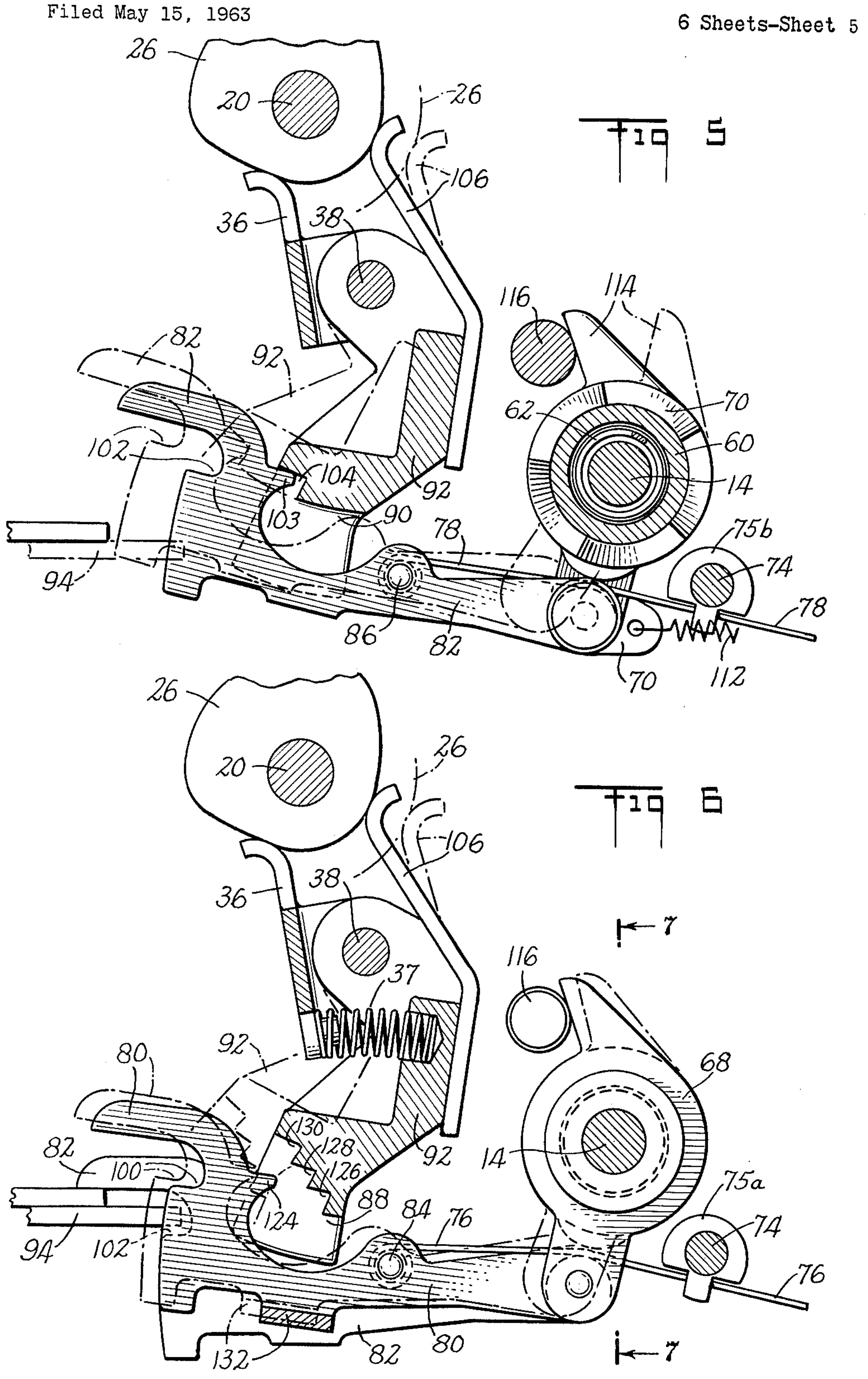

Considering first the case where a forward-spacing movement is desired, the following conditions obtain: selector solenoid 98 is not energized, tongue 94 prevents upward movement of link 80, and link 82 is lifted up when springs 76 and 78 are pressed by control rod 74. In this lifted position of link 82, as shown in FIGURE 5, a tooth 103 on the link is located directly opposite a notch 104 in the actuator arm 92. This actuator arm carries a cam follower 106 which rides on cam 26 so as to oscillate arm 92 about the shaft 38. Thus, when arm 92 moves to the rear, tooth 103 seats in notch 104 and the link 82 thereby is shifted to the rear as indicated in dotted outline in FIGURE 5.

This translational movement of link 82 to the rear produces a corresponding clockwise rotation of face cam 70 pivotally secured thereto, as indicated in dotted outline in FIGURE 5. Referring now to FIGURE 8, it will be apparent that this cam rotation tends to move the side surface of cam 70 away from the adjacent matching surface of cam 68, due to the angled configuration of the two surfaces. This movement, in turn, permits the guide rod to be forced to the right (FIGURE 7) by the spring 62 to the extent required to maintain the mating surfaces of the two cams 68 and 70 engaged.

Accordingly, with the carriage 12 locked to the guide rod 14 as explained above, this axial movement of the guide rod shifts the carriage in a forward direction. This forward movement of the carriage continues until cam follower 106 reaches the maximum-radius plateau portion of the cam 26, at which point the carriage will have undergone its maximum forward advance. Consequently, it will be evident that the carriage is driven forward an incremental step with respect to the record 10. Although this step can be of any desired size, in the present embodiment the mechanism is set to give a forward step corresponding to six grooves on the record.

After the carriage has thus been moved forward, the further rotation of cam 26 brings the smaller-radius portion of the cam under cam follower 36 (FIGURE 6) which thus is rotated clockwise by the bias spring 37 positioned between follower 36 and follower 106. This movement, in turn, permits the bell crank 50 to be rotated counterclockwise by its return spring 108 (see also FIGURE 2) which is fastened between the machine frame and the latch release 56 on the bell crank. The resulting reverse rotation of the guide rod 14 reengages the carriage 12 with the feedscrew, reengages the reproducing head with the record 10, and releases the carriage from the guide rod. Still further rotation of cam 26 causes the cam follower 106 to be rotated counterclockwise (FIGURE 5) as the link 82 and cam 70 are moved in reverse direction by the bias spring 112 which is fastened between the machine frame and a lower lobe on cam 70.

Thus, cam 70 is brought back to its normal position wherein a radial finger 114 thereof rests against a fixed bar 116. It should be noted that the cam bias spring 112 is sufficiently strong to overcome the force of the guide rod spring 62, so that the guide rod will return to its normal stationary position relative to the machine frame 22. This return movement of the guide rod completes the action in forward-spacing the carriage 12 a single incremental step. If the secretary desires to move the carriage a greater distance forward, the actuator solenoid 28 may be maintained energized (e.g. by keeping the foot-switch closed), and the operating mechanism will produce a continuing sequence of incremental advancing steps at a rate determined by the rotational speed of the drive cam 26.

Considering now the case where a backspacing movement is to be effected, the actuator solenoid 28 will be energized just as for a forward-spacing movement, and thus the guide rod 14 first will be rotated to (1) lock the carriage to the guide rod, (2) disengage the feedscrew and (3) retract the reproducing head, all as set forth hereinabove. In addition, the selector solenoid 98 will be energized along with the actuator solenoid 28, e.g. by a conventional foot-control switch. Thus armature 96 is drawn forward, as shown in FIGURES 2 and 8, and is held there during the initial portion of the cycle by a long latch lever 120 which is rotated about its pivot 121 by a bias spring 122.

This movement of armature 96 shifts tongue 94 laterally so as to enter the slot 102 of link 82, and hence only link 80 is lifted up when the free ends of the wire springs 76 and 78 are pressed down by the control rod 74 on the bell crank 50. As this bell crank reaches the end of its rotary stroke, its pin 56 strikes a short arm 123 of lever 120 to lift this lever out of its latching position against armature 96. Thus, this armature can return to normal position if the secretary only pressed her foot switch momentarily, although the backspacing cycle will continue to completion.

Referring again to FIGURE 6, link 80 is provided with a forwardly-projecting tooth 124 which, when the link is lifted up, is adapted to engage one of three notches 126, 128 and 130 in the actuator arm 92, thereby to shift link 80 rearwardly when this arm is rotated clockwise by its cam follower 106. These three notches are arranged in a stepped configuration such that the amount of rearward movement of link 80 produced by actuator arm 92 depends upon which notch is engaged by the tooth 124. The amount of movement of this link, in turn, determines the size of the backspacing step, as will be evident hereinbelow.

To control the upwards movement of link 80, and thereby select the notch 126, 128 or 130 to be engaged by the tooth 124, this link 80 is provided with an arm 132 (FIGURE 3), the end of which carries a stop pin 134 arranged to strike the lower edge of a stop plate 136. Referring also to FIGURE 2, plate 136 is pivoted about shaft 38 and is formed with a stepped lower surface so arranged that its rotational position determines the distance which the link 80 may be moved upwards before pin 134 is engaged.

Thus, when the stop plate 136 is in the position shown in solid outline in FIGURE 2, stop pin 134 will strike the lowest projecting part 138 of plate 136 so that link 80 will come to rest with its tooth 124 opposite the lowest notch 126 in the actuator arm 92 (FIGURE 6). In an intermediate rotational position of plate 136, pin 134 will strike an intermediate part 140 and thereby position tooth 124 opposite the intermediate notch 128. In a third rotational position of plate 136, as indicated in dotted outline in FIGURE 2, the link 80 will be permitted to move up the maximum distance required to place the tooth 124 in the top notch 130.

The stop plate 136 is rotatable about its pivot axis 38 by a pin 142 secured to a rocker 144 which is attached at 146 and 148 to a control button 150 pivoted at 152 and accessible to the secretary from outside the transcribing machine (see FIGURE 1). The three operating positions of this control button are defined by a detent arrangement consisting of three dents 154 formed in the rocker 144 and adapted to engage the rounded end of the shaft 38.

Accordingly, as explained hereinabove, the tooth 124 on the link 80 will engage a selected one of the notches 126, 128 or 130 on the actuator arm 92, and the link 80 will be shifted to the rear by the rotational movement of this actuator arm. This rearward movement of the link 80 correspondingly rotates the face cam 68 which is pivotally connected thereto. As can be seen from FIGURE 8, this rotational movement of the cam 68 will produce a corresponding axial movement of this cam away from the adjacent cam 70, due to the angular configuration of the mating cam surfaces. Referring also to FIGURE 7, this axial movement of cam 68 will correspondingly shift the guide rod 14 to the left against the tension of the coil spring 62. Thus, since the carriage 12 is at this time locked to the guide rod 14 as explained hereinabove, the carriage will be backspaced an amount corresponding to the rotation of the cam 68, and this rotation in turn is controlled by the setting of the control button 150. Although the size of the backspacing step could be of any desired magnitude, in the present embodiment the mechanism is set to give backspacing steps corresponding to two, four or six grooves on the record 10, for the three settings of the control button 150.

As soon as the backspacing step has been completed, the continued rotation of cam 26 permits cam follower 36 to be oscillated clockwise (FIGURE 4) by its bias spring 37. Thus the return spring 108 rotates the bell crank 50 and the guide rod 14 counterclockwise to reengage the carriage 12 with the feedscrew, reengage the reproducing head with the sound record 10, and release the carriage from the guide rod. Still further rotation of cam 26 permits the follower 106 to be rotated counterclockwise by the bias spring 37, thereby permitting the spring 62 (FIGURE 7) to shift the guide rod 14 to the right, back to its normal intermediate position. It will be evident that this movement also returns cam 68 and link 80 to their normal positions in readiness for another backspacing step. If the secretary holds the backspacing switch closed steadily, the mechanism described hereinabove will produce a continuing sequence of incremental backspacing steps at a rate proportional to the rotational speed of cam 26, and each step will be of a size determined by the setting of the control button 150.

It will be evident from the above description of the operating mechanism that each incremental step of carriage movement involves a rotation of guide rod 14 followed by an axial shift of this guide rod. The proper sequence of these actions is insured by the use of a single cam 26 which controls two separate cam followers 36 and 106 for the two distinct motions. The timing of the sequential functions is as follows (assuming that the actuator solenoid 28 is energized when the cam 26 is at a rotational position arbitrarily identified as 0°, and that a complete revolution of this cam is 360°): (1) after an initial idle period sufficient to effect the required engagement of parts, the guide rod 14 begins to rotate when cam 26 is at 36°; (2) the armature 30 of the solenoid 28 is released at 75°; (3) the feed nut of the carriage 12 is disengaged at 100°; (4) the guide rod rotation stops at 120°; (5) the guide rod axial movement for a six-groove step starts at 126°; (6) axial movement of the guide rod stops and reverse rotation of the guide rod begins at 210°; (7) the carriage feed nut is reengaged at 225°; (8) reverse rotation of the guide rod is complete at 252°; and the guide rod is returned axially to its normal position when cam 26 reaches a rotational position of 312°.

Although a specific preferred embodiment of the invention has been set forth in detail, it is desired to emphasize that this is not intended to be exhaustive or necessarily limitative; on the contrary, the showing herein is for the purpose of illustrating the invention and thus enable others skilled in the art to adapt the invention in such ways as meet the requirements of particular applications, it being understood that various modifications may be made without departing from the scope of the invention as limited by the prior art.

We claim:

1. Dictation apparatus comprising means for supporting a sound record adjacent a transducing head operable therewith, carriage means for producing relative traveling movement between said transducing head and said record, drive means for advancing said carriage means at constant speed, a normally stationary elongated member extending along the path of movement of said carriage means to be locked thereto for the purpose of shifting said carriage means in incremental steps, an operating mechanism for moving said elongated member in a direction parallel to said path while said carriage means is locked thereto to produce a step of relative movement between said sound record and said transducing head, remotely-controllable means for actuating said operating mechanism, and manually-operable adjustment means accessible from outside said dictation apparatus, said adjustment means including a motion-controlling mechanism arranged to alter the size of the step of movement of said elongated member produced in response to actuation of said operating mechanism by said remotely-controllable means.

2. Apparatus as claimed in claim 1, wherein said adjustment means comprises a manually-depressable key having a plurality of distinct positions, said motion-controlling mechanism including means to alter the size of said step by a constant amount as said key is shifted from any one of said positions to the next adjacent position.

3. Dictation apparatus comprising means for supporting a sound record adjacent a transducing head operable therewith, carriage means for producing relative traveling movement between said transducing head and said record, drive means adapted to supply the energy for moving said carriage means at constant speed, an elongated member extending along the path of movement of said carriage means to be locked thereto for the purpose of shifting said carriage means in incremental steps, rotary cam means for moving said elongated member in a direction parallel to said path while said carriage means is locked thereto to produce an incremental step of relative movement between said sound record and said transducing head, a linkage pivotally secured to said cam means and arranged for translational movement to rotate said cam means so as to produce said step of relative movement, remotely controllable means for producing said translational movement of said linkage, and adjustment means accessible from outside said dictation apparatus, said adjustment means including means to alter the extent of translational movement of said linkage in response to actuation thereof by said remotely controllable means.

4. Apparatus as claimed in claim 3, wherein said translational movement of said linkage is developed by an actuator arm, said linkage being engageable with different parts of said arm so as to produce different amounts of movement of said linkage for a given motion of said arm, said adjustment means serving to control selectively the engagement beween said linkage and said parts.

5. Apparatus as claimed in claim 4, wherein said linkage normally is positioned out of the path of movement of said actuator arm, and operating means for shifting said linkage into the path of movement of said arm to permit engagement between said linkage and any selected one of said parts.

6. Apparatus as claimed in claim 5, wherein said operating means comprises spring means urging said linkage towards engagement position, said adjustment means including means for selectively limiting the shifting movement of said linkage to positions where the appropriate one of said actuator arm parts is engaged by said linkage.

7. Apparatus as claimed in claim 5, including rotary drive means for rotating said elongated member to lock said carriage means thereto, said rotary drive means also including means to actuate said operating means to shift said linkage into the path of movement of said actuator arm.

8. Apparatus as claimed in claim 4, wherein said actuator arm is oscillated by said drive means.

9. Dictation apparatus comprising means for supporting a sound record adjacent a transducing head operable therewith, carriage means for producing relative traveling movement between said transducing head and said record, drive means including feedscrew means for producing advancing movement of said carriage means at constant speed, a normally stationary elongated member extending along the path of movement of said carriage means to be locked thereto for the purpose of shifting said carriage means, means mounting said member for movement parallel to said path; an operating mechanism for moving said elongated member while said carriage means is locked thereto, so as to produce an incremental step of relative movement between said sound record and said transducing head, said operating mechanism comprising a cam continuously rotated by said drive means and having first and second cam followers, first linkage means controlled by said first follower to rotate said member for the purpose of locking said carriage means thereto, second linkage means controlled by said second follower to shift said member axially after said carriage means has been locked thereto; and remotely controllable means for actuating said operating mechanism.

10. Dictation apparatus comprising means for supporting a sound record adjacent a transducing head operable therewith, a carriage for producing relative traveling movement between said transducing head and said record, a normally stationary elongated member extending along the path of movement of said carriage to be locked thereto for the purpose of shifting said carriage, means mounting said elongated member for movement parallel to said path and in both forward and reverse directions with respect to the stationary position thereof, cam means for moving said elongated member selectively in said forward and reverse directions while said carriage is locked thereto, a spring urging said elongated member in one of said directions, said cam means serving to restrain the movement thereof in said one direction, and remotely-controllable means for actuating said cam means, said remotely-controllable means having two conditions of operation in one of which said cam means is operative to produce a movement of said elongated member against the force of said spring and in the second of which said cam means is operative to permit said member to be shifted in said one direction by said spring.

11. Apparatus as claimed in claim 10, wherein said cam means includes first and second rotary face cams having complementary cam surfaces engaged under the pressure of said spring, said remotely-controllable means including means to rotate either cam selectively to produce said forward and reverse movements respectively.

12. Dictation apparatus comprising means for supporting a sound record adjacent a transducing head operable therewith, a carriage for producing relative traveling movement between said transducing head and said record, a normally stationary elongated member extending along the path of movement of said carriage to be locked thereto for the purpose of shifting said carriage, means mounting said elongated member for movement parallel to said path and in both forward and reverse directions with respect to the stationary position thereof, first and second operating means for moving said elongated member selectively in said forward and reverse directions while said carriage is locked thereto, and remotely-controllable means for actuating said first and second operating means, first and second resilient elements for transmitting activating movement from said remotely-controllable means to said first and second operating means, and remotely-operable selector means for selectively preventing activating movement of one of said operating means, whereby the other of said operating means will be activated by the movement transmitted through the corresponding resilient element from said remotely-controllable means.

13. Apparatus as claimed in claim 12, wherein said first and second operating means comprise first and second shiftably mounted links and a driven actuator, said first and second resilient elements being arranged to transmit shifting force to said links, respectively, to move said links into operative engagement with said actuator, said selector means serving to limit the shifting movement of the selected one of said links to prevent the engagement thereof with said actuator, whereby the other link is engaged by said actuator and is thereby actuated to effect the desired movement of said elongated member.

14. Apparatus as claimed in claim 13, including first and second rotary cam means for shifting said elongated member in said forward and reverse directions respectively, said first and second links being pivotally pinned to said cams so that one of said cams is rotated in accordance with the setting of said selector means.

15. Apparatus as claimed in claim 13, wherein said resilient elements comprise first and second elongated wire springs positioned side-by-side in a parallel relation, means mounting said wire springs for pivotal movement about a central region thereof, and control means for pressing one end of said wire springs to tend to rotate said springs about their pivot axis, the other ends of said wire springs being secured to said first and second links respectively.

16. Apparatus as claimed in claim 15, where said control means comprises a rod extending transversely to said wire springs, a pair of collars rotatably mounted on said rod, each of said collars being formed with a hole through which a corresponding one of said wire springs extends, whereby the movement of said rod is positively transmitted to said wire springs.

17. Dictation apparatus comprising means for supporting a sound record adjacent a transducing head operable therewith, carriage means for producing relative traveling movement between said transducing head and said record, an elongated member in a normally stationary position extending along the path of movement of said carriage means to be locked thereto for the purpose of shifting said carriage means, means mounting said member for movement parallel to said path and in both forward and reverse directions with respect to said normally stationary position; a first operating mechanism for oscillating said elongated member between said normally stationary position and a position forward thereof, said first operating mechanism including means for locking said carriage means to said member during the forward movement thereof and releasing said carriage means from said member during the subsequent rearward stroke thereof; a second operating mechanism for oscillating said elongated member between said normally stationary position and a position to the rear thereof, said second operating mechanism including means for locking said carriage means to said member during the rearward movement thereof and for releasing said carriage means from said member during the subsequent forward stroke thereof; and remotely controllable means for selectively actuating said first and second operating mechanisms so as to produce incremental steps of relative movement between said sound record and said transducing head in forward or reverse directions respectively.

18. Dictation apparatus comprising means for supporting a sound record adjacent a transducing head operable therewith, carriage means for producing relative traveling movement between said transducing head and said record, an elongated member extending along the path of movement of said carriage means to be locked thereto for the purpose of shifting said carriage means, means mounting said member for reciprocating movement parallel to said path; means for imparting said reciprocating movement to said elongated member; a first operating mechanism for locking said carriage means to said member during the forward movement thereof and releasing said carriage means from said member during the subsequent rearward stroke thereof; a second operating mechanism for locking said carriage means to said member during the rearward movement thereof and for releasing said carriage means from said member during the subsequent forward stroke thereof; and remotely controllable means for selectively actuating said first and second operating mechanisms so as to produce incremental steps of relative movement between said sound record and said transducing head in forward or reverse directions respectively.

References Cited by the Examiner

UNITED STATES PATENTS

| | | | |
|---|---|---|---|
| 2,070,180 | 2/1937 | Renholdt | 274—21 |
| 2,581,499 | 1/1952 | Roberts | 274—21 |
| 2,691,529 | 10/1954 | Schueler | 274—21 |
| 2,961,243 | 11/1960 | Schueler | 274—21 |

NORTON ANSHER, *Primary Examiner.*